United States Patent

[11] 3,566,738

| [72] | Inventor | George Moffat Cupit<br>77 Crockford Street, Port Melbourne,<br>Victoria, Australia |
|---|---|---|
| [21] | Appl. No. | 778,065 |
| [22] | Filed | Nov. 22, 1968 |
| [45] | Patented | Mar. 2, 1971 |
| [32] | Priority | Nov. 23, 1967 |
| [33] | | Australia |
| [31] | | 30216/67 |

[54] SEALING MEMBER FOR CLADDING SHEETS
8 Claims, 4 Drawing Figs.

[52] U.S. Cl..................................................... 85/1,
52/549, 85/50, 287/189.36
[51] Int. Cl....................................................... F16b 35/00
[50] Field of Search........................................ 85/82;
52/537, 549, 551; 287/189.35; 85/50, 1, 12 (P),
80; 287/189.36 (F)

[56] References Cited
UNITED STATES PATENTS

| 1,711,415 | 4/1929 | Lane | 85/1JP |
| 3,181,413 | 5/1965 | Wing | 85/50 |
| 3,191,730 | 6/1965 | Fischer | 52/549 |
| 3,247,752 | 4/1966 | Greenleaf et al. | 85/1JP |
| 3,386,757 | 6/1968 | Forward | 85/82 |
| 3,205,760 | 9/1965 | Seckerson et al. | 85/82 |

FOREIGN PATENTS

| 1,072,105 | 3/1954 | France | 52/549 |
| 1,364,365 | 5/1964 | France | 52/549 |
| 1,174,629 | 7/1964 | Germany | 85/1JP |

*Primary Examiner*—Edward C. Allen
*Attorney*—Sommers and Young

ABSTRACT: Apparatus for securing a cladding sheet to a structural support. The cladding sheet defines an aperture for securely receiving a resilient member having a depending boss. In assembling the combination, a rigid clamping plate is positioned to overlie the resilient member in such manner that a fastener can pass through aligned apertures in the clamping plate and in the resilient member. Only the resilient member has its through aperture elongated over its entire depth in the longitudinal direction of the cladding sheet to allow movement in unison and in the longitudinal direction of both the sheet and the resilient member relative to the fastener and the clamping plate.

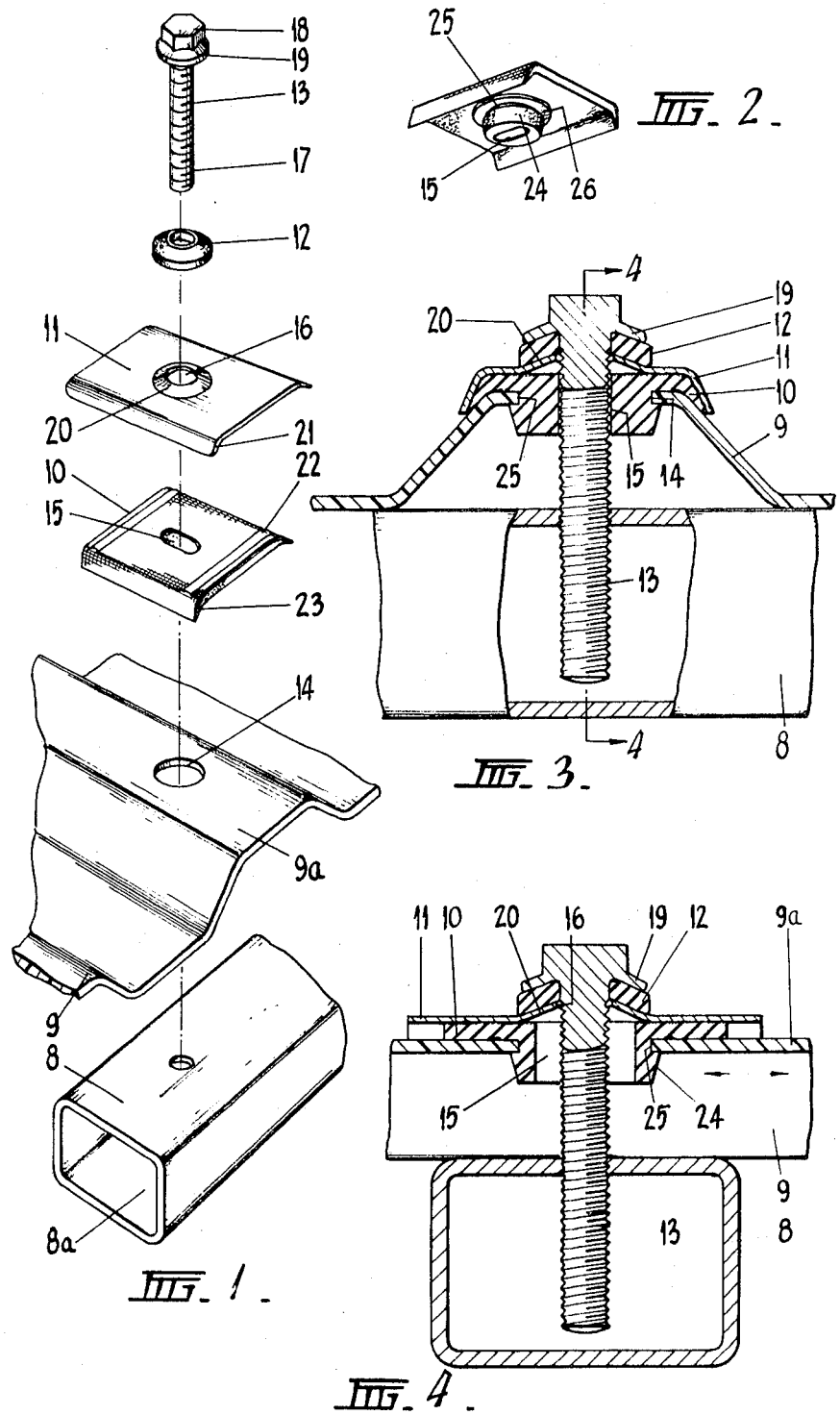

SEALING MEMBER FOR CLADDING SHEETS

This invention relates to a seal member used to seal between a cladding sheet, such as roofing or siding commonly made of steel, copper, aluminum or plastic, and a fastener by which the sheet is secured to a structure.

It is well known that the securing of such sheets to a building frame by means of fastener, such as screws, nails, bolts or rivets, poses the problem of adequately sealing the hole made in the cladding material against leakage of the elements, such as wind or rain.

Also it is well known that, if the cladding sheet is too rigidly held, then the forces created by thermal expansion and contraction, or by any movement of the structure may lead to buckling of the cladding or deformation of the holes through which the fastener passes. This buckling and deformation may cause partial or even complete failure of the seal, and thus create a source of leakage.

It has been found that different cladding materials, and different cross-sectional shapes of sheet, have varying resistance to buckling, but generally, the longer the length of the sheet and/or the higher the thermal coefficient of expansion of the particular material, then the greater is the problem of obtaining and maintaining an adequate seal.

Costly repairs and maintenance are frequently incurred to stop leaks caused by movement of the cladding sheet relative to the fastening.

It is the object of the present invention to provide a seal member for use between a cladding sheet and fastener which will maintain an effective seal under the conditions of thermal expansion, and structural movement commonly encountered.

With the above stated object in view, there is provided according to the invention, a seal member for location between a cladding sheet and a fastener therefor comprising a member of resilient material to be located between a portion of a fastener and the outer surface of the cladding sheet, an integral boss on one side of the member adapted to project into a complementary aperture in the cladding material, and an aperture extending through the boss dimensioned to be covered by said portion of the fastener and to secure another portion of the fastener with sufficient clearance in at least the longitudinal direction of the sheet to allow movement of the sheet and the seal member relative to the fastener in said direction.

The boss is conveniently of circular cross section, but may be of any convenient cross section complementary to the aperture in the cladding sheet. Also the aperture may be confined within the boss or extend fully across the boss to form a slot.

It is also an object of the present invention to provide a fastening assembly for receiving a cladding sheet to a support structure, and incorporating the above defined seal member.

With this further object in view, there is provided according to the present invention a fastening assembly comprising a seal member of resilient material having an integral boss on one side to project through a complementary aperture in a cladding sheet, an aperture extending axially through the boss, a rigid apertured clamp plate spanning the seal member with the respective apertures in alignment, a fastener member having a head and a shank extending through the aligned apertures in the seal member and clamp plate to penetrate a cladding support member, and a resilient seal element disposed about the shank between the head and clamp plate, said aperture in the boss of the seal member being dimensioned to receive the shank of the fastening member with sufficient clearance in at least the longitudinal direction of the sheet to allow movement of the sheet and seal member in said direction relative to the clamp plate and fastener member.

Conveniently, the boss has an external recess adjacent the junction of the boss with the remainder of the seal member, which cooperates in a grommet action with the aperture in the cladding sheet to attach the seal member to the sheet. The clearance of the fastener member in the boss aperture allows movement arising from thermal expansion or contraction, or other causes to take place. Also the seal member and sheet moving together due to the location of the seal member boss in the aperture in the sheet thus avoids damage to the seal member or cladding sheet.

In addition, the attachment of the seal member to the sheet greatly facilitates erection of the sheet as, once inserted, the seal members will remain in position for subsequent fitment of the fastener. Also, under some conditions, the seal members may be preassembled to the sheet before the sheets are placed into position on the building.

The fastener member is usually of a form having a shank of circular cross section, and the aperture in the boss of the seal member is a slot of a width substantially equal to the diameter of the shank and a length several times said diameter. However, the aperture may be of any shape provided there is sufficient clearance relative to the fastener to allow relative movement in at least the longitudinal direction of the sheet. A rib or a number of ribs may be provided on one or both faces of the seal member which provide areas of higher sealing pressure when the seal member is compressed between the sheet and the portion of the fastener member located on the opposite side of the seal member. These ribs extend completely across the width of the seal member in a direction transverse to the length of the sheet, and may be straight or curved or of other shape suitable for the particular shape of sealing member.

If ribs are provided on both faces of the sealing member, the ribs on one face may be staggered in respect to the ribs on the other face so as to provide a number of areas of increased pressure spaced along the sealing member. This arrangement results in the seal member being deformed in the area of the ribs in a somewhat waved formation.

Preferably, at least one of the mating surfaces of the seal member and fastener has an antifriction coating to facilitate the movement of the sheet and seal member. The antifriction coating may be a layer of fiber glass or a film of P.T.F.E., T.F.E., or one of the silicon compositions.

The invention will be more readily understood from the following description of a fastening assembly applied to securing corrugated sheets to a support structure, and as illustrated in the accompanying drawings.

In the drawings:

FIG. 1 is an exploded perspective view of the fastening assembly.

FIG. 2 is a underneath perspective view of the seal member.

FIG. 3 is a sectional view of the fastener assembly in a direction transverse to the length of the sheet; and FIG. 4 is a sectional view along line 4—4 in FIG. 3.

The cladding sheet 9 has spaced flat topped longitudinal corrugations 9a, and is an example of one of the many known forms of cladding sheet. The rectangular tubular member 8 represents a typical component of a frame structure to which the cladding sheet is attached. The sheet 9 is attached to the member 8 by the bolt 13 having a threaded shank 17 which passes through the sealing washer 12, clamp plate 11, seal member 10, and the sheet 9 to threadably engage the aperture 8a in the member 8.

The seal member 10 is a moulding of resilient natural or synthetic rubber or plastic material, preferably neoprene, having a central boss 24 projecting from the underside, and downwardly projecting lips 23 along each of the longitudinal edges. The boss 24 has a slightly tapered surface, terminating in an annular groove 25 at the base. The groove 25 is dimensioned to receive the marginal area of the sheet, surrounding the aperture 14, in a grommet type action. The tapered form of the boss is to facilitate insertion of the boss through the aperture 14 in the cladding sheet.

The aperture or slot 15, extending through the boss 24, is of a width to permit free passage of the shank 17 of the bolt 13, and is elongated in a longitudinal direction to permit limited movement in that direction between the seal member 10, and the bolt 13. A transverse rib 22 is provided adjacent either end of the seal member 10 and extends across the full width of the seal member. The upper surface of the seal member 10, including the lips 23 and ribs 22, is covered by a layer of fiber glass bonded thereto to provide an antifriction surface. As the slot 15 is elongated in a direction parallel to the lips 23, the lips are positioned to cooperate with the corrugations of the sheet so as to preclude the seal member being assembled to the sheet with the slot incorrectly positioned.

The clamp plate 11 is of a shape complementary to the seal member 10 including lips 21 along each longitudinal edge to overlay the lips 23 on the seal member. The central aperture 16 is of a diameter to receive the shank 17 of the bolt 13 without excess clearance and is surrounded by a raised portion 20 of truncated conical shape.

The bolt 13 has a dished flange 19 formed integral with the underside of the head 18. The shape of the flange is complementary to the raised portion 20 on the clamp plate, and the seal ring 12 has upper and lower conical faces to seat between the raised portion 20 and the flange 19.

As can be seen in FIGS. 3 and 4, tightening of the bolt 13 into the structural member 8 causes the seal member 10 to be pressed between the cladding sheet 9 and clamp plate 11, and also compresses the seal ring 12 between the flange 19 and the clamp plate 11. The form of lips 21 and 23 in relation to the form of the corrugation on the sheet are such that the lips are inclined to the sidewalls of the corrugation so that, upon tightening of the bolt, the lips 23 are pressed against the sidewalls of the corrugation.

The ribs 22 and the annular rib 26 on the under-side of the seal member 10 provide areas of local increased sealing pressure, in those areas where leakage is most likely to commence. Also the raised section 20 on the clamp plate stiffens the center of the clamp plate against deflection upon tightening of the bolt, so that there is more even distribution of the force transmitted from the bolt to the clamp plate. This stiffening reduces the likelihood of a depression being formed in the clamp plate upon tightening of bolt, in which water could accumulate and lead to leakage.

As can be seen in FIG. 4, there is substantial clearance in the direction of the length of the sheet between the shank 17 of the bolt and the seal member 10 so that any movement in the building frame or thermal expansion or contraction of the sheet is accommodated by the seal member 10 sliding with the sheet relative to the clamp plate 11 and bolt 13. It will be noted that the clamp plate is of sufficient length in the direction of the sheet so that this movement may take place without the seal member becoming exposed beyond the ends of the clamp plate. The coating of antifriction material on the seal member facilitates this movement to eliminate the risk of damage to the seal member.

I claim:

1. A fastening assembly for securing a cladding sheet to a support comprising, a seal member of resilient material having an integral boss on one side to project through a complementary aperture in the cladding material, an aperture extending axially through the boss, a rigid apertured clamp plate spanning the seal member with the respective apertures in alignment, a fastener member having a head and a shank extending through the aligned apertures in the seal member and clamp plate to penetrate a cladding support member, said aperture in said clamp plate generally conforming to the diameter of said shank, and a resilient seal element disposed about the shank between the head and clamp plate, said through aperture in the boss of the seal member being elongated to receive the shank of the fastening member with sufficient clearance over its entire depth in at least the longitudinal direction of the sheet to allow movement of the sheet and seal member in said direction relative to the fastener member.

2. The fastening assembly of claim 1 in which said seal member of resilient material is provided with an external recess in its boss adjacent the junction of said boss and the remainder of said resilient member to receive the margins of the aperture in the sheet in a grommet action.

3. The fastening assembly of claim 1 in which the aperture in the boss of said seal member of resilient materials is an elongated slot, and lips being provided on the edges of said resilient member parallel to said slot.

4. Means for securing a cladding sheet to a structural support comprising in combination:
   a resilient member having an integral depending boss adapted to project into and fit securely within a corresponding aperture in the cladding sheet;
   a rigid clamping plate adapted to overlie said resilient member;
   both said resilient member and said clamping plate defining an aperture therethrough, said aperture in said resilient member extending through said depending boss and both apertures being axially aligned when said resilient member and said clamping plate are juxtaposed with said resilient member interposed between said clamping plate and the cladding sheet, said aligned apertures being adapted to receive a fastener for securing said cladding sheet under pressure between said resilient member and the structural support;
   said resilient member only having its through aperture elongated over its entire depth in the longitudinal direction of the cladding sheet to allow movement in unison of both said sheet and said resilient member relative to said fastener and said clamping plate in said longitudinal direction; and
   the surface of said resilient member that engages the clamping plate having an adherent coating of antifriction material.

5. Means for securing a cladding sheet to a structural support comprising in combination:
   a resilient member having an integral depending boss adapted to project into and fit securely within a corresponding aperture in the cladding sheet;
   a rigid clamping plate adapted to overlie said resilient member;
   both said resilient member and said clamping plate defining an aperture therethrough, said aperture in said resilient member extending through said depending boss and both apertures being axially aligned when said resilient member and said clamping plate are juxtaposed with said resilient member interposed between said clamping plate and the cladding sheet, said aligned apertures being adapted to receive a fastener for securing said cladding sheet under pressure between said resilient member and the structural support;
   said resilient member only having its through aperture elongated over its entire depth in the longitudinal direction of the cladding sheet to allow movement in unison of both said sheet and said resilient member relative to said fastener and said clamping plate in said longitudinal direction; and
   the surface of said resilient member that engages the clamping plate being coated with a layer of fiberglass bonded thereto.

6. Means for securing a cladding sheet to a structural support comprising in combination:
   a resilient member having an integral depending boss adapted to project into and fit securely within a corresponding aperture in the cladding sheet;
   a rigid clamping plate adapted to overlie said resilient member;
   both said resilient member and said clamping plate defining an aperture therethrough, said aperture in said resilient member extending through said depending boss and both apertures being axially aligned when said resilient member and said clamping plate are juxtaposed with said resilient member interposed between said clamping plate and the cladding sheet, said aligned apertures being adapted to receive a fastener for securing said cladding sheet under pressure between said resilient member and the structural support, said resilient member only having its through aperture elongated over its entire depth in the longitudinal direction of the cladding sheet to allow movement in unison of both said sheet under pressure between said resilient member and the structural support;

> said resilient member only having its through aperture elongated over its entire depth in the longitudinal direction of the cladding sheet to allow movement in unison of both said sheet and said resilient member relative to said fastener and said clamping plate in said longitudinal direction; and
>
> said resilient member being provided with upstanding ribs to engage said clamping plate and provide areas of higher sealing pressure when said resilient member is pressed between said clamping plate and the sheet, said ribs extending across the full width of said resilient member in a direction transverse to the length of the sheet.

7. Means for securing a cladding sheet to a structural support comprising in combination:
- a resilient member having an integral depending boss adapted to project into and fit securely within a corresponding aperture in the cladding sheet;
- a rigid clamping plate adapted to overlie said resilient member;
- both said resilient member and said clamping plate defining an aperture therethrough, said aperture in said resilient member extending through said depending boss and both apertures being axially aligned when said resilient member and said clamping plate are juxtaposed with said resilient member interposed between said clamping plate and the cladding sheet, said aligned apertures being adapted to receive a fastener for securing said cladding sheet under pressure between said resilient member and the structural support;
- said resilient member only having its through aperture elongated over its entire depth in the longitudinal direction of the cladding sheet to allow movement in unison of both said sheet and said resilient member relative to said fastener and said clamping plate in said longitudinal direction; and
- the area of said clamping plate surrounding the aperture and on the side thereof opposite that facing said resilient member being of truncated conical shape.

8. Means for securing a cladding sheet to a structural support comprising in combination:
- a resilient member having an integral depending boss adapted to project into and fit securely within a corresponding aperture in the cladding sheet;
- a rigid clamping plate adapted to overlie said resilient member;
- both said resilient member and said clamping plate defining an aperture therethrough, said aperture in said resilient member extending through said depending boss and both apertures being axially aligned when said resilient member and said clamping plate are juxtaposed with said resilient member interposed between said clamping plate and the cladding sheet, said aligned apertures being adapted to receive a fastener for securing said cladding sheet under pressure between said resilient member and the structural support;
- said resilient member only having its through aperture elongated over its entire depth in the longitudinal direction of the cladding sheet to allow movement in unison of both said sheet and said resilient member relative to said fastener and said clamping plate in said longitudinal direction; and
- said resilient member having a lip which extends along each of its longitudinal edges, said lip projecting in substantially the same direction as the boss, and said clamping plate having complementary lips along the longitudinal edges thereof.